US010851276B2

(12) United States Patent
Fukushima et al.

(10) Patent No.: US 10,851,276 B2
(45) Date of Patent: *Dec. 1, 2020

(54) COMPOSITION FOR HEAT CYCLE SYSTEM, AND HEAT CYCLE SYSTEM

(71) Applicant: AGC Inc., Chiyoda-ku (JP)

(72) Inventors: Masato Fukushima, Chiyoda-ku (JP);
Hiroaki Mitsuoka, Chiyoda-ku (JP);
Mai Tasaka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,174

(22) Filed: Jun. 5, 2019

(65) Prior Publication Data

US 2019/0322916 A1    Oct. 24, 2019

Related U.S. Application Data

(63) Continuation of application No. 15/236,018, filed on Aug. 12, 2016, now Pat. No. 10,358,591, which is a
(Continued)

(30) Foreign Application Priority Data

Feb. 20, 2014    (JP) .................................. 2014-030857
Jun. 20, 2014    (JP) .................................. 2014-127744
(Continued)

(51) Int. Cl.
*C09K 5/04* (2006.01)
*C10M 171/00* (2006.01)
(Continued)

(52) U.S. Cl.
CPC ........... *C09K 5/045* (2013.01); *C10M 101/02* (2013.01); *C10M 105/00* (2013.01);
(Continued)

(58) Field of Classification Search
CPC .............. C09K 2205/126; C09K 5/045; C09K 2205/22; C09K 2205/24
See application file for complete search history.

(56) References Cited

U.S. PATENT DOCUMENTS 9,862,868 B2    1/2018  Fukushima
9,957,430 B2 *  5/2018  Fukushima ............ C09K 5/045
(Continued)

FOREIGN PATENT DOCUMENTS

CN         103534328 A      1/2014
JP         2015-174917 A   10/2015
(Continued)

OTHER PUBLICATIONS

International Search Report dated May 19, 2015 in PCT/JP2015/054651, filed on Feb. 19, 2015.

*Primary Examiner* — John R Hardee
(74) *Attorney, Agent, or Firm* — Oblon, McClelland, Maier & Neustadt, L.L.P.

(57) ABSTRACT

To provide a composition for a heat cycle system having favorable lubricating properties and comprising a working fluid for heat cycle which has a low global warming potential and which can replace R410A and a heat cycle system employing the composition. A composition for a heat cycle system comprising a working fluid for heat cycle containing trifluoroethylene, and a refrigerant oil (for example, an ester refrigerant oil, an ether refrigerant oil, a polyglycol refrigerant oil or a hydrocarbon refrigerant oil), and a heat cycle system employing the composition for a heat cycle system.

11 Claims, 1 Drawing Sheet

Related U.S. Application Data continuation of application No. PCT/JP2015/054651, filed on Feb. 19, 2015.

(30) Foreign Application Priority Data

| Jul. 18, 2014 | (JP) | 2014-148347 |
| Sep. 12, 2014 | (JP) | 2014-187002 |

(51) Int. Cl.

| C10M 105/06 | (2006.01) |
|---|---|
| C10M 105/38 | (2006.01) |
| C10M 107/24 | (2006.01) |
| C10M 107/34 | (2006.01) |
| C10M 105/02 | (2006.01) |
| F25B 1/00 | (2006.01) |
| F25B 31/00 | (2006.01) |
| C10M 101/02 | (2006.01) |
| C10M 105/00 | (2006.01) |
| C10M 105/32 | (2006.01) |
| C10M 105/42 | (2006.01) |
| C10M 105/48 | (2006.01) |
| C10N 20/00 | (2006.01) |
| C10N 30/06 | (2006.01) |
| C10N 30/12 | (2006.01) |
| C10N 30/20 | (2006.01) |
| C10N 30/00 | (2006.01) |
| C10N 40/30 | (2006.01) |

(52) U.S. Cl.
CPC ........ *C10M 105/02* (2013.01); *C10M 105/06* (2013.01); *C10M 105/32* (2013.01); *C10M 105/38* (2013.01); *C10M 105/42* (2013.01); *C10M 105/48* (2013.01); *C10M 107/24* (2013.01); *C10M 107/34* (2013.01); *C10M 171/008* (2013.01); *F25B 1/00* (2013.01); *F25B 31/002* (2013.01); *C09K 2205/122* (2013.01); *C09K 2205/126* (2013.01); *C09K 2205/22* (2013.01); *C10M 2203/065* (2013.01); *C10M 2205/223* (2013.01); *C10M 2207/0406* (2013.01); *C10M 2207/2805* (2013.01); *C10M 2207/2825* (2013.01); *C10M 2207/2835* (2013.01); *C10M 2207/301* (2013.01); *C10M 2207/325* (2013.01); *C10M 2209/043* (2013.01); *C10M 2209/1033* (2013.01); *C10N 2020/101* (2020.05); *C10N 2030/06* (2013.01); *C10N 2030/12* (2013.01); *C10N 2030/20* (2013.01); *C10N 2030/70* (2020.05); *C10N 2040/30* (2013.01); *F25B 2400/12* (2013.01); *F25B 2500/16* (2013.01)

(56) References Cited

U.S. PATENT DOCUMENTS

| 9,976,067 | B2* | 5/2018 | Fukushima | C09K 5/045 |
| 10,131,827 | B2* | 11/2018 | Fukushima | C09K 5/044 |
| 10,196,552 | B2* | 2/2019 | Fujii | C10M 171/00 |
| 10,351,746 | B2* | 7/2019 | Fukushima | F25B 1/00 |
| 10,358,591 | B2* | 7/2019 | Fukushima | C10M 105/32 |
| 10,377,934 | B2* | 8/2019 | Fukushima | B60H 1/00385 |
| 10,392,546 | B2* | 8/2019 | Fukushima | F25B 1/00 |
| 2010/0234256 | A1 | 9/2010 | Sato | |
| 2013/0012420 | A1 | 1/2013 | Matsumoto | |
| 2014/0070132 | A1 | 3/2014 | Fukushima | |
| 2014/0077122 | A1 | 3/2014 | Fukushima | |
| 2015/0008358 | A1 | 1/2015 | Okido et al. | |
| 2015/0337191 | A1 | 11/2015 | Fukushima | |
| 2016/0075927 | A1 | 3/2016 | Fukushima | |
| 2016/0333244 | A1 | 11/2016 | Fukushima | |
| 2017/0015935 | A1 | 1/2017 | Takahashi et al. | |
| 2017/0335159 | A1 | 11/2017 | Fukushima et al. | |

FOREIGN PATENT DOCUMENTS

| JP | 2015-214930 A | 12/2015 |
| WO | WO 2011/118733 A1 | 9/2011 |
| WO | WO 2012/157764 A1 | 11/2012 |
| WO | WO 2014/123120 A1 | 8/2014 |
| WO | WO 2014/178353 A1 | 11/2014 |
| WO | WO 2015/005290 A1 | 1/2015 |

* cited by examiner

COMPOSITION FOR HEAT CYCLE SYSTEM, AND HEAT CYCLE SYSTEM

CROSS-REFERENCE TO RELATED APPLICATIONS

This application is a continuation application of U.S. patent application Ser. No. 15/236,018, now U.S. Pat. No. 10,358,591 filed Aug. 12, 2016, which is a continuation application of PCT Application No. PCT/JP2015/054651, filed on Feb. 19, 2015, which is based upon and claims the benefit of priority from Japanese Patent Application No. 2014-030857 filed on Feb. 20, 2014, Japanese Patent Application No. 2014-127744 filed on Jun. 20, 2014, Japanese Patent Application No. 2014-148347 filed on Jul. 18, 2014 and Japanese Patent Application No. 2014-187002 filed on Sep. 12, 2014. The contents of those applications are incorporated herein by reference in their entireties.

TECHNICAL FIELD

The present invention relates to a composition for a heat cycle system, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs of HFOs in combination for the purpose of increasing the flame retardancy, cycle performance, etc. of the working fluid.

However, HFO-1123 is a compound having an unsaturated bond in its molecule and is a compound having a very short life in the air, and accordingly under conditions under which compression and heating are repeatedly carried out in a heat cycle, it is inferior in the stability to a saturated hydrofluorocarbon or hydrochlorofluorocarbon such as a conventional HFC or HCFC, and lubricating properties may be decreased in the heat cycle system.

Thus, a method for efficiently operating a heat cycle system employing HFO-1123 as a working fluid, with maintained lubricity while excellent cycle performance of HFO-1123 is sufficiently made use of.

PRIOR ART DOCUMENTS

Patent Documents

Patent Document 1: WO2012/157764

DISCLOSURE OF INVENTION

Technical Problem

The present invention has been made under these circumstances, and its object is to provide a composition for a heat cycle system comprising trifluoroethylene (HFO-1123), with stable lubricity of HFO-1123, while the low global warming potential and excellent cycle performance of HFO-1123 are sufficiently made use of, and a heat cycle system employing the composition, which has less influence over global warming and has high cycle performance, and in which the lubricity of the working fluid for heat cycle is improved.

Solution to Problem

The present invention provides a working fluid for heat cycle, a composition for a heat cycle system and a heat cycle system of the following [1] to [15].

[1] A composition for a heat cycle system comprising a working fluid for heat cycle containing trifluoroethylene, and a refrigerant oil.
[2] The composition for a heat cycle system according to [1], wherein the refrigerant oil is at least one member selected from an ester refrigerant oil, an ether refrigerant oil, a polyglycol refrigerant oil and a hydrocarbon refrigerant oil.
[3] The composition for a heat cycle system according to [2], wherein the refrigerant oil is at least one member selected from a dibasic acid ester, a polyol ester, a complex ester, a polyol carbonate ester, a polyvinyl ether, a polyalkylene glycol and an alkylbenzene.
[4] The composition for a heat cycle system according to any one of [1] to [3], wherein the kinematic viscosity of the refrigerant oil at 40° C. is from 1 to 750 mm$^2$/s.

[5] The composition for a heat cycle system according to any one of [1] to [4], wherein the kinematic viscosity of the refrigerant oil at 100° C. is from 1 to 100 mm²/s.
[6] The composition for a heat cycle system according to any one of [1] to [5], wherein the proportion (carbon/oxygen molar ratio) of carbon atoms to oxygen atoms of the refrigerant oil is from 2 to 7.5.
[7] The composition for a heat cycle system according to any one of [1] to [6], wherein the working fluid for heat cycle further contains a saturated hydrofluorocarbon.
[8] The composition for a heat cycle system according to [7], wherein the saturated hydrofluorocarbon is at least one member selected from difluoromethane, 1,1-difluoroethane, 1,1,1,2-tetrafluoroethane and pentafluoroethane.
[9] The composition for a heat cycle system according to [1] to [8], wherein the working fluid for heat cycle further contains a hydrofluorocarbon having a carbon-carbon double bond other than trifluoroethylene.
[10] The composition for a heat cycle system according to [9], wherein the hydrofluorocarbon having a carbon-carbon double bond is at least one member selected from 1,3,3,3-tetrafluoropropene and 2,3,3,3-tetrafluoropropene.
[11] The composition for a heat cycle system according to any one of [1] to [10], wherein the content of trifluoroethylene is at least 10 mass % per 100 mass % of the working fluid for heat cycle.
[12] The composition for a heat cycle system according to [11], wherein the content of trifluoroethylene is from 20 to 80 mass % per 100 mass % of the working fluid for heat cycle.
[13] The composition for a heat cycle system according to [11] or [12], wherein the working fluid for heat cycle further contains difluoromethane, and the content of difluoromethane is at least 20 mass % per 100 mass % of the working fluid for heat cycle.
[14] A heat cycle system, which employs the composition for a heat cycle system as defined in any one of [1] to [13].
[15] The heat cycle system according to [14], which is a refrigerating apparatus, an air-conditioning apparatus, a power generation system, a heat transport apparatus or a secondary cooling machine.

Advantageous Effects of Invention

According to the present invention, it is possible to provide a composition for a heat cycle system comprising trifluoroethylene (HFO-1123), with more stable lubricity of a working fluid for heat cycle containing HFO-1123, while the low global warming potential and excellent cycle performance of HFO-1123 are sufficiently made use of.

The heat cycle system of the present invention is a heat cycle system which has less influence over global warming and has high cycle performance, and in which the lubricating properties of the working fluid for heat cycle are improved.

DESCRIPTION OF EMBODIMENTS

Figure 1:
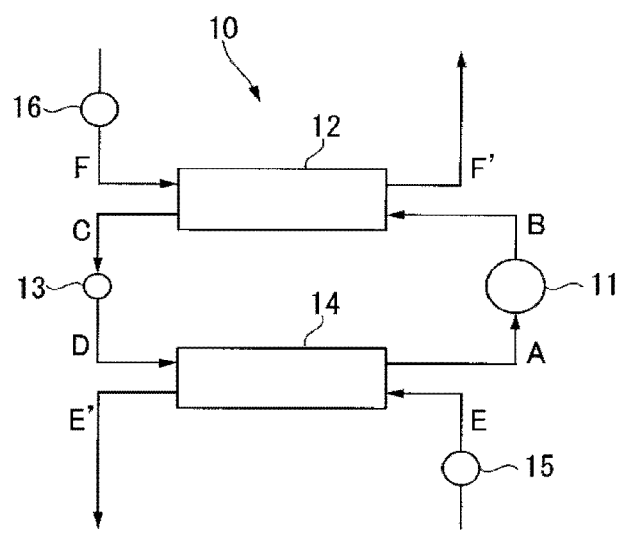
FIG. 1 is a schematic construction view illustrating a refrigerating cycle system as an example of a heat cycle system of the present invention.

Now, the present invention will be described in detail.
[Composition for Heat Cycle System]
The composition for a heat cycle system comprises a working fluid for heat cycle containing HFO-1123, and a refrigerant oil.
As a heat cycle system to which the composition of a heat cycle system of the present invention is applied, a heat cycle system by a heat exchanger such as a condenser or an evaporator may be used without any particular restriction. The heat cycle system, for example, a refrigerating cycle system, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.
When HFO-1123 is used as a working fluid for such a heat cycle system, depending upon the temperature conditions and the pressure conditions, HFO-1123 may be destabilized and undergo self-decomposition, thus deteriorating the function of the working fluid for heat cycle. In the composition for a heat cycle system of the present invention, by the coexistence of a refrigerant oil, lubricity of HFO-1123 as a working fluid for heat cycle is improved, whereby efficient cycle performance can be exhibited.
Now, components in the composition for a heat cycle system of the present invention will be described.
<Working Fluid>
The composition for a heat cycle system of the present invention contains, as a working fluid, HFO-1123. The working fluid of the present invention may contain an optional component described hereinafter as the case requires in addition to HFO-1123. The content of HFO-1123 is preferably at least 10 mass %, more preferably from 20 to 80 mass %, further preferably from 40 to 80 mass %, still more preferably from 40 to 60 mass % per 100 mass % of the working fluid.
(HFO-1123)
Properties of HFO-1123 as a working fluid are shown in Table 1 particularly in terms of relative comparison with R410A (a pseudoazeotropic mixture of HFC-32 and HFC-125 in a mass ratio of 1:1). The cycle performance is represented by the coefficient of performance and the refrigerating capacity obtained by the after-mentioned method. The coefficient of performance and the refrigerating capacity of HFO-1123 are represented by relative values based on R410A (1.000) (hereinafter referred to as relative coefficient of performance and relative refrigerating capacity). The global warming potential (GWP) is a value (100 years) in Intergovernmental Panel on Climate Change (IPCC), Fourth assessment report (2007), or a value measured in accordance therewith. In this specification, GWP is such a value unless otherwise specified. In a case where the working fluid is a mixture, the temperature glide is an important factor in evaluation of the working fluid and is preferably smaller, as described hereinafter.

TABLE 1

|  | R410A | HFO-1123 |
| --- | --- | --- |
| Relative coefficient of performance | 1.000 | 0.921 |
| Relative refrigerating capacity | 1.000 | 1.146 |
| Temperature glide [° C.] | 0.2 | 0 |
| GWP | 2088 | 0.3 |

[Optional Component]

The working fluid used in the present invention may optionally contain a compound commonly used for a working fluid, in addition to HFO-1123, within a range not to impair the effects of the present invention. Such an optional compound (optional component) may, for example, be a HFC, a HFO (a HFC having a carbon-carbon double bond) other than HFO-1123, or another component which is vaporized and liquefied together with HFO-1123. The optional component is preferably a HFC or a HFO (a HFC having a carbon-carbon double bond) other than HFO-1123.

The optional component is preferably a compound which can maintain GWP and the temperature glide within acceptable ranges while having an effect to further improve the relative coefficient of performance and the relative refrigerating capacity, when used for heat cycle in combination with HFO-1123. When the working fluid contains such a compound in combination with HFO-1123, more favorable cycle performance will be obtained while a low GWP is maintained, and influence over the temperature glide tends to be small.

(Temperature Glide)

In a case where the working fluid contains an optional component, it has a considerable temperature glide except for a case where HFO-1123 and the optional component form an azeotropic composition. The temperature glide of the working fluid varies depending upon the type of the optional component and the mixture ratio of HFO-1123 and the optional component.

In a case where a mixture is used as the working fluid, it is usually preferably an azeotropic mixture or a pseudoazeotropic mixture such as R410A. A non-azeotropic composition has a problem such that when it is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Such problems can be avoided with an azeotropic or pseudoazeotropic mixture.

As an index to the applicability of a mixture as the working fluid, the "temperature glide" is commonly employed. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0, for example, the temperature glide of R410A is 0.2.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide. Accordingly, when a mixture is used as a working fluid, a working fluid with an appropriate temperature glide is desired.

(HFC)

The HFC as the optional component is preferably selected from the above viewpoint. Here, a HFC is known to have a higher GWP as compared with HFO-1123. Accordingly, the HFC to be used in combination with HFO-1123 is preferably selected properly particularly with a view to maintaining GWP within an acceptable range, in addition to improving the cycle performance as the working fluid and maintaining the temperature glide within an appropriate range.

A HFC which has less influence over the ozone layer and which has less influence over global warming, is specifically preferably a $C_{1-5}$ HFC. The HFC may be linear, branched or cyclic.

The HFC may, for example, be a fluoride of a $C_{1-5}$ alkane, and may be preferably trifluoromethane, HFC-32, difluoroethane, trifluoroethane, tetrafluoroethane, HFC-125, trifluoroiodomethane, pentafluoropropane, hexafluoropropane, heptafluoropropane, pentafluorobutane, heptafluorocyclopentane or the like.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134) or 1,1,1,2-tetrafluoroethane (HFC-134a) or HFC-125, more preferably HFC-32, HFC-152a, HFC-134a or HFC-125.

The HFC may be used alone or in combination of two or more.

The content of the HFC in the working fluid (100 mass %) can be optionally selected depending upon the properties required for the working fluid. For example, in the case of a working fluid comprising HFO-1123 and HFC-32, the coefficient of performance and the refrigerating capacity will improve with a HFC-32 content within a range of from 1 to 99 mass %. In the case of a working fluid comprising HFO-1123 and HFC-134a, the coefficient of performance will improve with a HFC-134a content within a range of from 1 to 99 mass %.

Further, with respect to GWP of the preferred HFC, GWP of HFC-32 is 675, GWP of HFC-134a is 1,430, and GWP of HFC-125 is 3,500. With a view to keeping GWP of the obtainable working fluid low, the HFC as the optional component is most preferably HFC-32.

Further, HFO-1123 and HFC-32 may form a pseudoazeotropic mixture close to an azeotropic mixture within a composition range of from 99:1 to 1:99 by the mass ratio, and the temperature glide of a mixture of them is close to 0 substantially regardless of the composition range. In this view also, as the HFC to be used in combination with HFO-1123, HFC-32 is advantageous.

In a case where HFC-32 is used together with HFO-1123 for the working fluid of the present invention, the content of HFC-32 is specifically preferably at least 20 mass %, more preferably from 20 to 80 mass %, further preferably from 40 to 60 mass % per 100 mass % of the working fluid.

(HFO Other than HFO-1123)

The HFO other than HFO-1123 as an optional component is also preferably selected from the same viewpoint as the above HFC. Here, GWP of the HFO even other than HFO-1123 is an order of magnitude lower than the HFC. Accordingly, the HFO other than HFO-1123 used in combination with HFO-1123 is preferably selected properly particularly with a view to improving the cycle performance as the working fluid and maintaining the temperature glide within an appropriate range, rather than considering GWP.

The HFO other than HFO-1123 may, for example, be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), (E)-1,2,3,3,3-pentafluoropropene (HFO-1225ye(E)), (Z)-1,2,3,3,3- pentafluoropropene (HFO-1225ye(Z)), (E)-1,3,3,3-tetrafluoropropene (HFO-1234ze(E)), (Z)-1,3,3,3-tetrafluoropropene (HFO-1234ze(Z)) or 3,3,3-trifluoropropene (HFO-1243zf).

Particularly, the HFO other than HFO-1123 is, in view of a high critical temperature and excellent durability and coefficient of performance, preferably HFO-1234yf (GSP: 4), HFO-1234ze(E) or HFO-1234ze(Z) (GWPs of both (E)-form and (Z)-form being 6), more preferably HFO-1234yf or HFO-1234ze(E). The HFO other than HFO-1123 may be used alone or in combination of two or more.

The content of the HFO other than HFO-1123 in the working fluid (100 mass %) may be optionally selected depending upon the properties required for the working fluid. For example, in the case of a working fluid comprising HFO-1123 and HFO-1234yf or HFO-1234ze, the coefficient of performance will improve with a HFO-1234yf or HFO-1234ze content within a range of from 1 to 99 mass %.

A preferred composition range in a case where the working fluid used in the present invention contains HFO-1123 and HFO-1234yf will be described below as the composition range (S).

In the formulae indicating the composition range (S), abbreviated names of the respective compounds indicate the proportions (mass %) of the respective compounds based on the total amount of HFO-1123, HFO-1234yf and other components (such as HFC-32).

<Composition Range (S)>

HFO-1123+HFO-1234yf≥70 mass %

95 mass %≥HFO-1123/(HFO-1123+HFO-1234yf)≥35 mass %

The working fluid in the composition range (S) has a very low GWP and has a small temperature glide. Further, it has refrigerating cycle performance sufficient as an alternative to conventional R410A also from the viewpoint of the coefficient of performance, the refrigerating capacity and the critical temperature.

In the working fluid in the composition range (S), based on the total amount of HFO-1123 and HFO-1234yf, the proportion of HFO-1123 is more preferably from 40 to 95 mass %, further preferably from 50 to 90 mass %, particularly preferably from 50 to 85 mass %, most preferably from 60 to 85 mass %.

Further, the total content of HFO-1123 and HFO-1234yf in 100 mass % of the working fluid is more preferably from 80 to 100 mass %, further preferably from 90 to 100 mass %, particularly preferably from 95 to 100 mass %.

Further, the working fluid used in the present invention may be a combination of HFO-1123, a HFC and a HFO other than HFO-1123. In such a case, the working fluid preferably comprises HFO-1123, HFC-32 and HFO-1234yf, and the proportions of the respective compounds based on the entire amount of the working fluid are preferably within the following ranges.

10 mass %≤HFO-1123≤80 mass %

10 mass %≤HFC-32≤75 mass %

5 mass %≤HFO-1234yf≤60 mass %

Further, in a case where the working fluid used in the present invention contains HFO-1123, HFO-1234yf and HFC-32, a preferred composition range (P) is shown below. In the following formulae indicating the composition range (P), abbreviated names of the respective compounds indicate the proportions (mass %) of the respective compounds based on the total amount of HFO-1123, HFO-1234yf and HFC-32. The same applies to the composition ranges (R), (L) and (M). Further, in the following composition range, the total content of HFO-1123, HFO-1234yf and HFC-32 specifically described is preferably higher than 90 mass % and at most 100 mass % based on the entire amount of the working fluid for heat cycle.

<Composition Range (P)>

70 mass %≤HFO-1123+HFO-1234yf 30 mass %≤HFO-1123≤80 mass %

0 mass %<HFO-1234yf≤40 mass %

0 mass %<HFC-32≤30 mass %

HFO-1123/HFO-1234yf≤95/5 mass %

The working fluid in the above composition is a working fluid having respective characteristics of HFO-1123, HFO-1234yf and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained.

As a more preferred composition of the working fluid used in the present invention, a composition containing HFO-1123 in a proportion of from 30 to 70 mass %, HFO-1234yf in a proportion of from 4 to 40 mass % and HFC-32 in a proportion of from 0 to 30 mass % based on the total amount of HFO-1123, HFO-1234yf and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is preferably at least 5 mass %, more preferably at least 8 mass %.

Further, another preferred composition in a case where the working fluid used in the present invention contains HFO-1123, HFO-1234yf and HFC-32 will be shown, and when the content of HFO-1123 based on the entire amount of the working fluid is at most 70 mol %, a working fluid of which self-decomposition reaction of HFO-1123 is suppressed and which has high durability can be obtained.

A more preferred composition range (R) will be described below.

<Composition Range (R)>

10 mass %≤HFO-1123<70 mass %

0 mass %<HFO-1234yf≤50 mass %

30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A preferred range of the working fluid of the present invention in the composition range (R) will be described below.

20 mass %≤HFO-1123<70 mass %

0 mass %<HFO-1234yf≤40 mass %

30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

A more preferred composition range (L) of the working fluid of the present invention in the above composition range (R) will be described below. A composition range (M) is still more preferred.

<Composition Range (L)>

10 mass %≤HFO-1123<70 mass %

0 mass %<HFO-1234yf≤50 mass %

30 mass %<HFC-32≤44 mass %

<Composition Range (M)>

20 mass %≤HFO-1123<70 mass %

5 mass %≤HFO-1234yf≤40 mass %

30 mass %<HFC-32≤44 mass %

The working fluid in the composition range (M) is a working fluid having respective characteristics of HFO-1123, HFO-1234yf and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234yf. Further, in view of a high relative refrigerating capacity, more preferably HFO-1234yf≤35 mass %.

A preferred composition range in a case where the working fluid used in the present invention contains HFO-1123 and HFO-1234ze(E) will be described below as the composition range (T).

In the formulae indicating the composition range (T), abbreviated names of the respective compounds indicate the proportions (mass %) of the respective compounds based on the total amount of HFO-1123, HFO-1234ze(E) and other components (such as HFC-32).

<Composition Range (T)>

HFO-1123+HFO-1234ze(E)≥70 mass %

95 mass %≥HFO-1123/(HFO-1123+HFO-1234ze(E))≥35 mass %

The working fluid in the composition range (T) has a very low GWP and has a small temperature glide. Further, it has refrigerating cycle performance sufficient as an alternative to conventional R410A also from the viewpoint of the coefficient of performance, the refrigerating capacity and the critical temperature.

In the working fluid in the composition range (T), based on the total amount of HFO-1123 and HFO-1234ze(E), the proportion of HFO-1123 is more preferably from 40 to 95 mass %, further preferably from 50 to 90 mass %, particularly preferably from 50 to 85 mass %, most preferably from 60 to 85 mass %.

Further, the total content of HFO-1123 and HFO-1234ze(E) in 100 mass % of the working fluid is more preferably from 80 to 100 mass %, further preferably from 90 to 100 mass %, particularly preferably from 95 to 100 mass %.

Further, the working fluid used in the present invention may be a combination of HFO-1123, a HFC and a HFO other than HFO-1123. In such a case, the working fluid preferably comprises HFO-1123, HFC-32 and HFO-1234ze(E), and the proportions of the respective compounds based on the entire amount of the working fluid are preferably within the following ranges.

10 mass %≤HFO-1123≤80 mass %

10 mass %≤HFC-32≤75 mass %

5 mass %≤HFO-1234ze(E)≤60 mass %

Further, in a case where the working fluid used in the present invention contains HFO-1123, HFO-1234ze(E) and HFC-32, a preferred composition range (Q) is shown below.

In the following formulae indicating the composition range (Q), abbreviated names of the respective compounds indicate the proportions (mass %) of the respective compounds based on the total amount of HFO-1123, HFO-1234ze(E) and HFC-32. The same applies to the composition ranges (U), (K) and (N). Further, in the following composition range, the total amount of HFO-1123, HFO-1234ze(E) and HFC-32 specifically described is preferably higher than 90 mass % and at most 100 mass % based on the entire amount of the working fluid for heat cycle.

<Composition Range (Q)>

70 mass %≤HFO-1123+HFO-1234ze(E)

30 mass %≤HFO-1123≤80 mass %

0 mass %<HFO-1234ze(E)≤40 mass %

0 mass %<HFC-32≤30 mass %

HFO-1123/HFO-1234ze(E)≤95/5 mass %

The working fluid in the above composition is a working fluid having respective characteristics of HFO-1123, HFO-1234ze(E) and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained.

As a more preferred composition of the working fluid used in the present invention, a composition containing HFO-1123 in a proportion of from 30 to 70 mass %, HFO-1234ze(E) in a proportion of from 4 to 40 mass % and HFC-32 in a proportion of from 0 to 30 mass % based on the total amount of HFO-1123, HFO-1234ze(E) and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is preferably at least 5 mass %, more preferably at least 8 mass %.

Further, another preferred composition in a case where the working fluid used in the present invention contains HFO-1123, HFO-1234ze(E) and HFC-32 will be shown, and when the content of HFO-1123 based on the entire amount of the working fluid is at most 70 mol %, a working fluid of which self-decomposition reaction of HFO-1123 is suppressed and which has high durability can be obtained.

A more preferred composition range (U) will be described below.

<Composition Range (U)>

10 mass %≤HFO-1123≤70 mass %

0 mass %<HFO-1234ze(E)≤50 mass %

30 mass %<HFC-32≤75 mass %

The working fluid in the above composition is a working fluid having respective characteristics of HFO-1123, HFO-1234ze(E) and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A preferred range of the working fluid of the present invention in the composition range (U) will be described below.

20 mass %≤HFO-1123<70 mass %

0 mass %<HFO-1234ze(E)≤40 mass %

30 mass %<HFC-32≤75 mass %

The working fluid in the above composition is a working fluid having respective characteristics of HFO-1123, HFO-1234ze(E) and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

A more preferred composition range (K) of the working fluid of the present invention in the above composition range (U) will be described below. A composition range (N) is still more preferred.

<Composition Range (K)>

10 mass %≤HFO-1123<70 mass %

0 mass %<HFO-1234ze(E)≤50 mass %

30 mass %<HFC-32≤44 mass %

<Composition Range (N)>

20 mass %≤HFO-1123<70 mass %

5 mass %≤HFO-1234ze(E)≤40 mass %

30 mass %<HFC-32≤44 mass %

The working fluid in the composition range (N) is a working fluid having respective characteristics of HFO-1123, HFO-1234ze(E) and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234ze(E). Further, in view of a high relative refrigerating capacity, more preferably HFO-1234ze(E)≤35 mass %.

(Other Optional Component)

The working fluid to be used for the composition for a heat cycle system of the present invention may contain, other than the above optional component, carbon dioxide, a hydrocarbon, a chlorofluoroolefin (CFO), a hydrochlorofluoroolefin (HCFO), or the like. Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid contains a hydrocarbon, its content is less than 10 mass %, preferably from 1 to 5 mass %, more preferably from 3 to 5 mass % per 100 mass % of the working fluid. When the content of the hydrocarbon is at least the lower limit, the solubility of a mineral refrigerant oil in the working fluid will be more favorable.

The CFO may, for example, be chlorofluoropropene or chlorofluoroethylene. With a view to suppressing flammability of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid contains the HCFO, the content of the HCFO per 100 mass % of the working fluid is less than 1 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid to be used for the composition for a heat cycle system of the present invention contains the above other optional component, the total content of such optional components in the working fluid is less than 10 mass %, preferably at most 8 mass %, more preferably at most 5 mass % per 100 mass % of the working fluid.

<Refrigerant Oil>

The composition for a heat cycle system of the present invention comprises, in addition to the above working fluid, a refrigerant oil which can improve lubricating properties of the working fluid containing HFO-1123.

The refrigerant oil to be used in the present invention may, for example, be specifically an ester refrigerant oil, an ether refrigerant oil, a polyglycol refrigerant oil or a hydrocarbon refrigerant oil.

Among them, from the viewpoint of compatibility with trifluoroethylene as an essential component of the working fluid of the present invention, preferred is an oxygen-containing synthetic refrigerant oil such as an ester refrigerant oil, an ether refrigerant oil or a polyglycol refrigerant oil, more preferred is an ester refrigerant oil or an ether refrigerant oil.

Such a refrigerant oil may be used alone or in combination of two or more. Further, the kinematic viscosity of the refrigerant oil at 40° C. is preferably from 1 to 750 mm$^2$/s, more preferably from 1 to 400 mm$^2$/s in that the lubricity and the closeability of a compressor are not lowered, the refrigerant oil is satisfactorily compatible with the working fluid under low temperature conditions, it is possible to prevent lubricity failure of a refrigerator or a compressor, and heat exchange in an evaporator can be sufficiently conducted. Further, the kinematic viscosity at 100° C. is preferably from 1 to 100 mm$^2$/s, more preferably from 1 to 50 mm$^2$/s, with a view to maintaining the electric power consumption and the abrasion resistance within proper ranges.

Particularly in the case of an ester refrigerant oil or an ether refrigerant oil, as atoms constituting the refrigerant oil, carbon atoms and oxygen atoms are representatively mentioned. If the proportion (carbon/oxygen molar ratio) of carbon atoms to oxygen atoms is too low, moisture absorbance tends to be high, and if the proportion is too high, the compatibility with the working fluid will be decreased. From such a viewpoint, the proportion of carbon atoms to oxygen atoms in the refrigerant oil is suitably from 2 to 7.5 by the molar ratio.

Further, the hydrocarbon refrigerant oil is required to circulate in the heat cycle system together with the working fluid. In the most preferred embodiment, the refrigerant oil and the working fluid are soluble in each other, however, when a refrigerant oil which can circulate with the working fluid in the heat cycle system is selected, such a refrigerant oil with low solubility (for example, refrigerant oils disclosed in Japanese Patent No. 2803451) may be used as one component of the composition for a heat cycle system of the present invention. In order that the refrigerant oil circulates in the heat cycle system, the refrigerant oil is required to have a low kinematic viscosity. In the present invention, the kinematic viscosity of the hydrocarbon refrigerant oil at 40° C. is preferably from 1 to 50 mm$^2$/s, particularly preferably from 1 to 25 mm$^2$/s.

Further, such a refrigerant oil may contain a stabilizer to prevent deterioration of the working fluid and the refrigerant oil. The additive may, for example, be an oxidation resistance-improving agent, a heat resistance-improving agent or a metal deactivator, and the content of the stabilizer is within a range not to remarkably decrease the effects of the present invention, and is usually at most 5 mass %, preferably at most 3 mass % in the composition for heat cycle (100 mass %).

<Ester Refrigerant Oil>

As the ester refrigerant oil, in view of chemical stability, a dibasic acid ester refrigerant oil of a dibasic acid and a monohydric alcohol, a polyol ester refrigerant oil of a polyol and a fatty acid, a complex ester refrigerant oil of a polyol, a polybasic acid and a monohydric alcohol (or a fatty acid), a polyol carbonate ester refrigerant oil or the like may be mentioned as the base oil component.

(Dibasic Acid Ester Refrigerant Oil)

The dibasic acid ester refrigerant oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid or terephthalic acid, particularly a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Such a dibasic acid ester refrigerant oil may, for example, be specifically ditridecyl glutarate, di(2-ethylhexyl) adipate, diisodecyl adipate, ditridecyl adipate or di(3-ethylhexyl) sebacate.

(Polyol Ester Refrigerant Oil)

The polyol ester refrigerant oil is an ester synthesized from a polyhydric alcohol and a fatty acid (a carboxylic acid), having a carbon/oxygen molar ratio of at least 2 and at most 7.5, preferably at least 3.2 and at most 5.8.

The polyhydric alcohol constituting the polyol ester refrigerant oil may be a diol (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol), a polyol having from 3 to 20 hydroxy groups (such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, a polyhydric alcohol such as adonitol, arabitol, xylitol or mannitol, a saccharide such as xylose, arabinose, ribose, rhamnose, glucose, fructose, galactose, mannose, sorbose, cellobiose, maltose, isomaltose, trehalose, sucrose, raffinose, gentianose or melezitose, or a partially etherified product thereof), and the polyhydric alcohol constituting the ester may be used alone or in combination of two or more.

The number of carbon atoms in the fatty acid constituting the polyol ester refrigerant oil is not particularly limited, but usually a $C_{1-24}$ fatty acid is employed. A linear fatty acid or a branched fatty acid is preferred. The linear fatty acid may, for example, be acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid or linoleic acid, and the hydrocarbon group bonded to the carboxy group may be a totally saturated hydrocarbon or may have an unsaturated hydrocarbon. Further, the branched fatty acid may, for example, be 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid or 2,2-diisopropylpropanoic acid. The ester may be an ester of one or more of such fatty acids.

The polyol constituting the ester may be used alone or as a mixture of two or more. Further, the fatty acid constituting the ester may be a single component or may be two or more types. Further, the fatty acid may be used alone or as a mixture of two or more. Further, the polyol ester refrigerant oil may have a free hydroxy group.

The polyol ester refrigerant oil is specifically more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol) or tri-(pentaerythritol), further preferably an ester of neopentyl glycol, trimethylolethane, trimethyloipropane, trimethylolbutane, pentaerythritol or di-(pentaerythritol), preferably an ester of neopentyl glycol, trimethyloipropane, pentaerythritol, di-(pentaerythritol) or the like and a $C_{2-20}$ fatty acid.

The fatty acid constituting such a polyhydric alcohol/fatty acid ester may be only a fatty acid having a linear alkyl group or a fatty acid having a branched structure, or may be a mixed ester of linear and branched fatty acids. Further, as the fatty acid constituting the ester, two or more types selected from the above fatty acids may be used.

As a specific example, in the case of a mixed ester of linear and branched fatty acids, the molar ratio of a linear $C_{4-6}$ fatty acid to a branched $C_{7-9}$ fatty acid is from 15:85 to 90:10, preferably from 15:85 to 85:15, more preferably from 20:80 to 80:20, further preferably from 25:75 to 75:25, most preferably from 30:70 to 70:30. Further, the proportion of the total amount of a linear $C_{4-6}$ fatty acid and a branched $C_{7-9}$ fatty acid based on the entire amount of the fatty acids constituting the polyhydric alcohol/fatty acid ester is at least 20 mol %. The fatty acid composition should be selected so as to satisfy both a sufficient compatibility with the working fluid and a viscosity required as the refrigerant oil. Here, the proportion of the fatty acids is a value based on the entire amount of the fatty acids constituting the polyhydric alcohol/fatty acid ester contained in the refrigerant oil.

(Complex Ester Refrigerant Oil)

The complex ester refrigerant oil is an ester of a fatty acid and a dibasic acid, and a monohydric alcohol and a polyol. The fatty acid, the dibasic acid, the monohydric alcohol and the polyol may be the same as described above.

The fatty acid may be a fatty acid exemplified for the above polyol ester.

The dibasic acid may, for example, be oxalic acid, malonic acid, succinic acid, glutaric acid, adipic acid, pimelic acid, suberic acid, azelaic acid, sebacic acid, phthalic acid, isophthalic acid or terephthalic acid.

The polyol may be a polyol exemplified as the polyhydric alcohol for the above polyol ester. The complex ester is an ester of such a fatty acid, a dibasic acid and a polyol, and each compound may consist of a single component or several components.

(Polyol Carbonate Refrigerant Oil)

The polyol carbonate refrigerant oil is an ester of carbonic acid and a polyol.

The polyol may, for example, be a polyglycol (such as polyalkylene glycol, its ether compound or a modified compound thereof) obtained by homopolymerizing or copolymerizing a diol (as described above), a polyol (as described above), or one having a polyglycol added to a polyol.

The polyalkylene glycol may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol may contain single oxyalkylene units or two or more types of oxyalkylene units. It is preferred that at least oxypropylene units are contained in one molecule. Further, the polyol carbonate refrigerant oil may be a ring-opening polymer of a cyclic alkylene carbonate.

<Ether Refrigerant Oil>

The ether refrigerant oil may, for example, be a polyvinyl ether refrigerant oil or a polyalkylene glycol refrigerant oil.

(Polyvinyl Ether Refrigerant Oil)

The polyvinyl ether refrigerant oil may be one obtained by polymerizing a vinyl ether monomer, one obtained by copolymerizing a vinyl ether monomer and a hydrocarbon monomer having an olefinic double bond, or a copolymer of a polyvinyl ether and an alkylene glycol or a polyalkylene glycol or a monoether thereof.

The carbon/oxygen molar ratio of the polyvinyl ether refrigerant oil is at least 2 and at most 7.5, preferably at least 2.5 and at most 5.8. If the carbon/oxygen molar ratio is less than such a range, moisture absorbance tends to be high, and if it exceeds such a range, the compatibility will be decreased. Further, the weight average molecular weight of the polyvinyl ether is preferably at least 200 and at most 3,000, more preferably at least 500 and at most 1,500. The kinematic viscosity at 40° C. is preferably from 1 to 750 mm$^2$/s, more preferably from 1 to 400 mm$^2$/s. Further, the kinematic viscosity at 100° C. is preferably from 1 to 100 mm$^2$/s, more preferably from 1 to 50 mm$^2$/s.

Structure of Polyvinyl Ether Refrigerant Oil

The vinyl ether monomer may be used alone or in combination of two or more. The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or an alkyl-substituted styrene. The hydrocarbon monomer having an olefinic double bond may be used alone or in combination of two or more.

The polyvinyl ether copolymer may be either of a block copolymer and a random copolymer. The polyvinyl ether refrigerant oil may be used alone or in combination of two or more.

A preferably used polyvinyl ether refrigerant oil has structural units represented by the following formula (1):

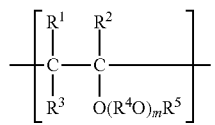
(1)

wherein each of R$^1$, R$^2$ and R$^3$ which may be the same or different from one another, is a hydrogen atom or a C$_{1-8}$ hydrocarbon group, R$^4$ is a C$_{1-10}$ bivalent hydrocarbon group or a C$_{2-20}$ bivalent hydrocarbon group containing an ether bond oxygen, R$^5$ is a C$_{1-20}$ hydrocarbon group, m is a number which makes the average of m in the polyvinyl ether from 0 to 10, each of R$^1$ to R$^5$ in different structural units may be the same or different, and when m is 2 or more in one structural unit, a plurality of R$^4$O may be the same or different.

In the above formula (1), it is preferred that at least one of R$^1$, R$^2$ and R$^3$ is a hydrogen atom, and it is particularly preferred that all of them are hydrogen atoms. m in the formula (1) is preferably at least 0 and at most 10, more preferably at least 0 and at most 5, particularly preferably 0. R$^5$ in the formula (1) is a C$_{1-20}$ hydrocarbon group. Such a hydrocarbon group may, for example, be an alkyl group such as a methyl group, an ethyl group, a n-propyl group, an isopropyl group, a n-butyl group, an isobutyl group, a sec-butyl group, a tert-butyl group, various forms of a pentyl group, various forms of a hexyl group, various forms of a heptyl group or various forms of an octyl group, a cycloalkyl group such as a cyclopentyl group, a cyclohexyl group, various forms of a methylcyclohexyl group, various forms of an ethylcyclohexyl group or various forms of a dimethylcyclohexyl group, an aryl group such as a phenyl group, various forms of a methylphenyl group, various forms of an ethylphenyl group or various forms of a dimethylphenyl group, or an arylalkyl group such as a benzyl group, various forms of a phenylethyl group or various forms of a methylbenzyl group. An alkyl group, a cycloalkyl group, a phenyl group, an aryl group or an arylalkyl group may, for example, be mentioned, and an alkyl group, particularly a C$_{1-5}$ alkyl group is preferred.

The polyvinyl ether refrigerant oil according to this embodiment may be a homopolymer consisting of a single type or structural units represented by the formula (1) or may be a copolymer constituted by two or more types of structural units. The copolymer may be either of a block copolymer and a random copolymer.

The polyvinyl ether refrigerant oil according to this embodiment may be constituted solely of the structural units represented by the above formula (1) or may be a copolymer further containing structural units represented by the following formula (2). In such a case, the copolymer may be either of a block copolymer and a random copolymer.

(2)

wherein each of R$^6$ to R$^9$ which may be the same or different, is a hydrogen atom or a C$_{1-20}$ hydrocarbon group.

(Polyvinyl Ether Monomer)

The vinyl ether monomer may be a compound of the following formula (3):

(3)

wherein R$^1$, R$^2$, R$^3$, R$^4$, R$^5$ and m are the same as R$^1$, R$^2$, R$^3$, R$^4$, R$^5$ and m in the formula (1).

There are various vinyl ether monomers corresponding to the polyvinyl ether compound, and the vinyl ether monomer may, for example, be vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxy-propyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene or 2-tert-butoxy-2-butene. Such a vinyl ether monomer may be prepared by a known method.

Terminal of Polyvinyl Ether

The terminal of the polyvinyl ether compound having structural units represented by the above formula (1) to be used as the refrigerant oil for the composition for a heat cycle system of the present invention may be converted to a desired structure by the method disclosed in Examples or by a known method. The group to which the terminal is to be converted may, for example, be saturated hydrocarbon, ether, alcohol, ketone, amide or nitrile.

The polyvinyl ether compound to be used as the refrigerant oil for the composition for a heat cycle system of the present invention is suitably one having a terminal structure represented by any of the following formulae (4) to (8).

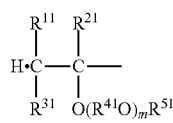
(4)

wherein each of $R^{11}$, $R^{21}$ and $R^{31}$ which may be the same or different from one another, is a hydrogen atom or a $C_{1-8}$ hydrocarbon group, $R^{41}$ is a $C_{1-10}$ bivalent hydrocarbon group or a $C_{2-20}$ bivalent hydrocarbon group having an ether bond oxygen, $R^{51}$ is a $C_1$ hydrocarbon group, m is a number which makes the average of m in the polyvinyl ether from 0 to 10, and when m is 2 or more, a plurality of $R^{41}O$ may be the same or different;

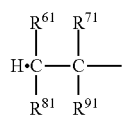
(5)

wherein each of $R^{61}$, $R^{71}$, $R^{81}$ and $R^{91}$ which may be the same or different, is a hydrogen atom or a $C_{1-20}$ hydrocarbon group;

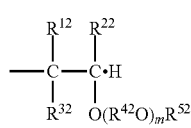
(6)

wherein $R^{12}$, $R^{22}$ and $R^{32}$ which may be the same or different from one another, is a hydrogen atom or a $C_{1-8}$ hydrocarbon group, $R^{42}$ is a $C_{1-10}$ bivalent hydrocarbon group or a $C_{2-20}$ bivalent hydrocarbon group containing an ether bond oxygen, $R^{52}$ is a $C_{1-20}$ hydrocarbon group, m is a number which makes the average of m in the polyvinyl ether from 0 to 10, and when m is 2 or more, a plurality of $R^{42}O$ may be the same or different;

(7)

wherein $R^{62}$, $R^{72}$, $R^{82}$ and $R^{92}$ which may be the same or different from one another, is a hydrogen atom or a $C_{1-20}$ hydrocarbon group;

(8)

wherein $R^{13}$, $R^{23}$ and $R^{33}$ which may be the same or different from one another, is a hydrogen atom or a $C_{1-8}$ hydrocarbon group.

(Method for Producing Polyvinyl Ether Refrigerant Oil)

The polyvinyl ether refrigerant oil according to this embodiment may be produced by e.g. radical polymerization, cationic polymerization or radiation polymerization of the above monomer. After completion of the polymerization reaction, as the case requires, conventional separation or purification may be applied to obtain a desired polyvinyl ether compound having structural units represented by the formula (1).

(Polyalkylene Glycol Refrigerant Oil)

The polyalkylene glycol refrigerant oil may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol refrigerant oil may contain single oxyalkylene units or two or more types of oxyalkylene units. It is preferred that at least oxypropylene units are contained in one molecule.

A specific polyoxyalkylene glycol refrigerant oil may, for example, be a compound represented by the following formula (9):

(9)

wherein $R^{101}$ is a hydrogen atom, a $C_{1-10}$ alkyl group, a $C_{2-10}$ acyl group or a $C_{1-10}$ aliphatic hydrocarbon group having 2 to 6 binding sites, $R^{102}$ is a $C_{2-4}$ alkylene group, $R^{103}$ is a hydrogen atom, a $C_{1-10}$ alkyl group or a $C_{2-10}$ acyl group, l is an integer of from 1 to 6, and k is a number which makes the average of k×l from 6 to 80.

In the above formula (9), the alkyl group as each of $R^{101}$ and $R^{103}$ may be linear, branched or cyclic. The alkyl group may, for example, be specifically a methyl group, an ethyl group, a n-propyl group, an isopropyl group, various forms of a butyl group, various forms of a pentyl group, various forms of a hexyl group, various forms of a heptyl group, various forms of an octyl group, various forms of a nonyl group, various forms of a decyl group, a cyclopentyl group or a cyclohexyl group. If the number of carbon atoms in the alkyl group exceeds 10, the compatibility with the working fluid will be decreased, thus leading to phase separation. The number of carbon atoms in the alkyl group is preferably from 1 to 6.

The alkyl group moiety in the acyl group as each of $R^{101}$ and $R^{103}$ may be linear, branched or cyclic. As specific examples of the alkyl group moiety in the acyl group, various $C_{1-9}$ groups mentioned as the specific examples of the alkyl group may be mentioned. If the number of carbon atoms in the acyl group exceeds 10, the compatibility with the working fluid will be decreased, thus leading to phase separation. The number of carbon atoms in the acyl group is preferably from 2 to 6.

In a case where both $R^{101}$ and $R^{103}$ are an alkyl group or an acyl group, $R^{101}$ and $R^{103}$ may be the same or different from each other.

Further, in a case where l is at least 2, the plurality of $R^{103}$ in one molecule may be the same or different from each other.

In a case where $R^{101}$ is a $C_{1-10}$ aliphatic hydrocarbon group having from 2 to 6 binding sites, the aliphatic hydrocarbon group may be chain-like or cyclic. The aliphatic hydrocarbon group having two binding sites may, for example, be an ethylene group, a propylene group, a butylene group, a pentylene group, a hexylene group, a heptylene group, an octylene group, a nonylene group, a decylene group, a cyclopentylene group or a cyclohexylene group. Further, an aliphatic hydrocarbon group having from 3 to 6 binding sites may, for example, be trimethylolpropane, glycerin, pentaerythritol, sorbitol; 1,2,3-trihydroxycyclohexane; or a residue having a hydroxy group removed from a polyhydric alcohol such as 1,3,5-trihydroxycyclohexane.

If the number of carbon atoms in the aliphatic hydrocarbon group exceeds 10, the compatibility with the working fluid will be decreased, thus leading to a phase separation. The number of carbon atoms is preferably form 2 to 6.

$R^{102}$ in the above formula (9) is a $C_{2-4}$ alkylene group, and the oxyalkylene group as a repeating unit may be an oxyethylene group, an oxypropylene group or an oxybutylene group. One molecule of the compound of the formula (9) may contain single type of oxyalkylene groups or two or more types of oxyalkylene groups. It is preferred that at least oxypropylene units are contained in one molecule, and it is particularly preferred that at least 50 mol % of oxypropylene units are contained in oxyalkylene units.

In the above formula (9), l is an integer of from 1 to 6 and is defined depending upon the number of the binding sites of $R^{101}$. For example, in a case where $R^{101}$ is an alkyl group or an acyl group, l is 1, and in a case where $R^{101}$ is an aliphatic hydrocarbon group having 2, 3, 4, 5 or 6 binding sites, l is 2, 3, 4, 5 or 6, respectively. Further, k is a number which makes the average of k×l from 6 to 80, and if the average of k×l is out of the above range, the objects of the present invention will not sufficiently be accomplished.

The structure of the polyalkylene glycol is suitably polypropylene glycol dimethyl ether represented by the following formula (10) or poly(oxyethylene oxypropylene) glycol dimethyl ether represented by the following formula (11) in view of economical efficiency and the above-described effects, and is more preferably polypropylene glycol monobutyl ether represented by the following formula (12), further suitably polypropylene glycol monomethyl ether represented by the following formula (13), poly(oxyethylene oxypropylene) glycol monomethyl ether represented by the following formula (14), poly(oxyethylene oxypropylene) glycol monobutyl ether represented by the following formula (15) or polypropylene glycol diacetate represented by the following formula (16) in view of economical efficiency, etc.

 (10)

(wherein h is a number of from 6 to 80)

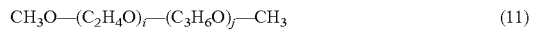 (11)

(wherein each of i and j is a number of at least 1, provided that the sum of i and j is from 6 to 80)

 (12)

(wherein h is a number of from 6 to 80)

 (13)

(wherein h is a number of from 6 to 80)

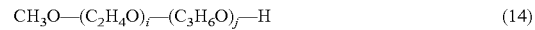 (14)

(wherein each of i and j is a number of at least 1, provided that the sum of i and j is from 6 to 80)

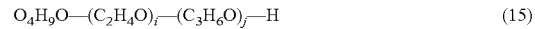 (15)

(wherein each of i and j is a number of at least 1, provided that the sum of i and j is from 6 to 80)

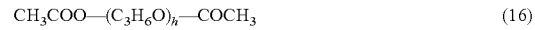 (16)

(wherein h is a number of from 6 to 80)

Such polyoxyalkylene glycols may be used alone or in combination of two or more.

The kinematic viscosity of the polyalkylene glycol represented by the above formula (9) at 40° C. is preferably from 1 to 750 mm²/s, more preferably from 1 to 400 mm²/s. Further, the kinematic viscosity at 100° C. is preferably from 1 to 100 mm²/s, more preferably from 1 to 50 mm²/s.

<Hydrocarbon Refrigerant Oil>

As the hydrocarbon refrigerant oil, an alkylbenzene may be used.

As the alkylbenzene, a branched alkylbenzene prepared from a polymer of propylene and benzene as materials using a catalyst such as hydrogen fluoride, or a linear alkylbenzene prepared from n-paraffin and benzene as materials using the same catalyst may be used. The number of carbon atoms in the alkyl group is preferably from 1 to 30, more preferably from 4 to 20, from the viewpoint of a favorable viscosity as a lubricating oil base oil. Further, the number of alkyl groups in one molecule of the alkylbenzene is preferably from 1 to 4, more preferably from 1 to 3, in order that the viscosity is within a set range, although it depends on the number of carbon atoms in the alkyl group.

Further, the refrigerant oil is required to circulate in the heat cycle system together with the working fluid. In the most preferred embodiment, the refrigerant oil and the working fluid are soluble in each other, however, when a refrigerant oil which can circulate with the working fluid in the heat cycle system is selected, such a refrigerant oil with low solubility may be used for the composition of the present invention. In order that the refrigerant oil circulates in the heat cycle system, the refrigerant oil is required to have a low kinematic viscosity. In the present invention, the kinematic viscosity of the alkylbenzene at 40° C. is preferably from 1 to 50 mm²/s, particularly preferably from 1 to 25 mm²/s.

Such a refrigerant oil may be used alone or in combination of two or more.

Such a refrigerant oil is preferably used as a composition for a heat cycle system as mixed with the working fluid. On that occasion, the proportion of the refrigerant oil is preferably from 5 to 60 mass %, more preferably from 10 to 50 mass % based on the entire amount of the composition for a heat cycle system.

<Other Optional Component>

The composition for a heat cycle system may contain a known optional component in addition within a range not to impair the effects of the present invention. As such an optional component, for example, a leak detecting substance may be mentioned, and such a leak detecting substance optionally contained may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by the mass, more preferably at most 0.5 part by the mass per 100 parts by the mass of the working fluid.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine. Among them, the heat cycle system of the present invention, which efficiently exhibits heat cycle performance in a working environment at higher temperature, is preferably employed as an air-conditioning apparatus to be disposed outdoors in many cases. Further, the heat cycle system of the present invention is preferably employed also for a refrigerator.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as an example of the heat cycle system according the embodiment of the present invention, a refrigerating cycle system will be described with reference to a refrigerating cycle system 10 which has been roughly described above, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy diagram (curve) as shown in FIG. 2, may be represented as a trapezoid having points A, B, C and D as vertexes.

Figure 2:
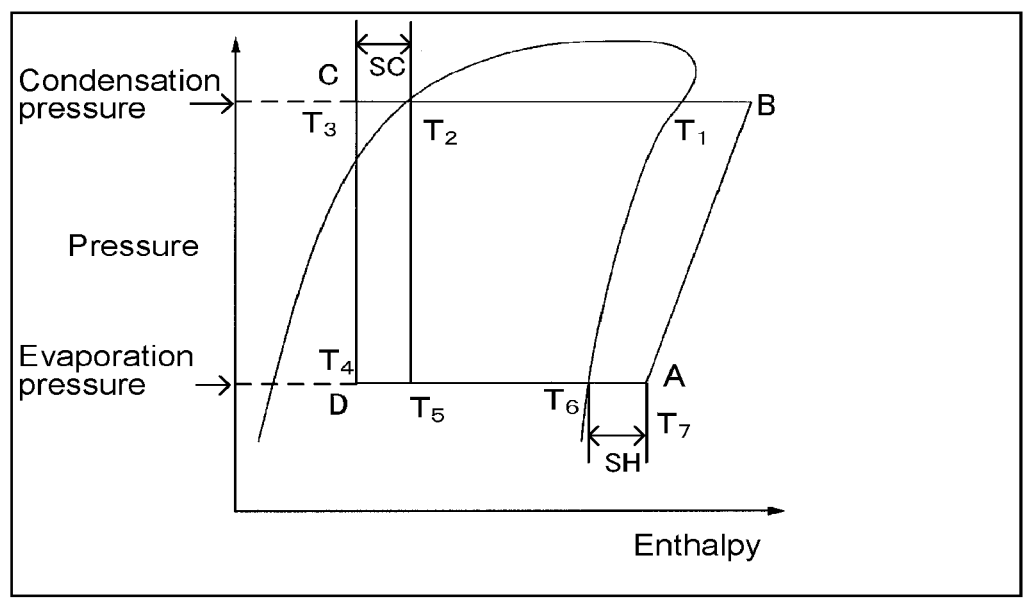
FIG. 2 is a cycle diagram illustrating the state change of a working fluid in a refrigerating cycle system in FIG. 1 on a pressure-enthalpy diagram.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy diagram and the BC line, the intersection point $T_1$ on the high enthalpy side is the condensing temperature, and the intersection point $T_2$ on the low enthalpy side is the condensation boiling point temperature. Here, in a case where the working fluid is a mixed fluid of HFO-1123 with another working fluid and is a non-azeotropic mixture fluid, the temperature glide is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy diagram and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (A) and (B) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \tag{A}$$

$$COP = Q/\text{compression work} = (h_A - h_D)/(h_B - h_A) \tag{B}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention employing the composition for a heat cycle system of the present invention, in a refrigerating cycle system 10 shown in FIG. 1 for example, as compared with a case where R410 (a mixed fluid of HFC-32 and HFC-125 in a mass ratio of 1:1) which has been commonly used for an air-conditioning apparatus or the like, it is possible to achieve high levels of Q and COP, i.e. equal to or higher than those of R410A, while remarkably suppressing the global worming potential.

Further, since the working fluid contained in the composition for a heat cycle system to be employed may have a composition with which the temperature glide of the working fluid is suppressed to a certain level or lower, and in such a case, the composition change when the composition for a heat cycle system is put into a refrigerator or an air-conditioning apparatus from a pressure container and a change in the refrigerant composition in a refrigerator or an air-conditioning apparatus when the refrigerant leaks out from the refrigerator or the air-conditioning apparatus, can be suppressed to lower levels. Further, according to the composition for a heat cycle system of the present invention, the lubricating properties of HFO-1123 contained in the working fluid which the composition comprises, are improved, and accordingly a heat cycle system employing the composition can maintain a more efficient circulation state of the working fluid as compared with a conventional system, and can be stably operated.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol refrigerant oil or a polyol ester refrigerant oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the composition for a heat cycle system in a liquid state, in view of the dehydration efficiency. For example, the desiccating agent is located at the outlet of the condenser 12 or at the inlet of the evaporator 14 to be brought into contact with the composition for a heat cycle system.

The desiccating agent is preferably a zeolite desiccating agent in view of chemical reactivity of the desiccating agent and the composition for a heat cycle system, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (C) as the main component in view of excellent moisture absorption capacity.

$$M_{2/n}O \cdot Al_2O_3 \cdot xSiO_2 \cdot yH_2O \tag{C}$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid and the refrigerant oil contained in the composition for a heat cycle system is used, the working fluid and the refrigerant oil is adsorbed in the desiccating agent and as a result, chemical reaction between the working fluid and the refrigerant oil and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid and the refrigerant oil, it is possible to selectively adsorb and remove only moisture in the heat cycle system without adsorbing the working fluid and the refrigerant oil. In other words, the working fluid and the refrigerant oil are less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the composition for a heat cycle system is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the composition for a heat cycle system of the present invention, favorable lubricating properties are achieved, practically sufficient heat cycle performance can be obtained while suppressing influence over global warming, and there is substantially no problem with respect to the temperature glide.

EXAMPLES

Now, the present invention will be described in further detail with reference to Examples of the present invention (Ex. 1 to 40, 55 to 158, 185 to 292, 320 to 415), conventional Examples (Ex. 41 to 44) and Comparative Examples (Ex. 45 to 54, 159 to 184, 293 to 319 and 416 to 439). In each Ex., 50 g of the working fluid and 50 g of the refrigerant oil in a combination as identified in Tables 4 to 43 were mixed and dissolved to prepare a composition for a heat cycle system. Accordingly, the composition for a heat cycle system in Ex. is one comprising 50 mass % of the working fluid and 50 mass % of the refrigerant oil.

The following working fluids and refrigerant oils were used. Compounds constituting the working fluids are shown in Tables 2 and 3.

TABLE 2

| Working fluid | HFO-1123 | HFC-32 | HFO-1234yf | HFC-134a | HFC-152a | HFC-125 |
|---|---|---|---|---|---|---|
| 1 | 100 | | | | | |
| 2 | 20 | 80 | | | | |
| 3 | 40 | 60 | | | | |
| 4 | 50 | 50 | | | | |
| 5 | 60 | 40 | | | | |
| 6 | 80 | 20 | | | | |
| 7 | 30 | 40 | 30 | | | |
| 8 | 50 | | | 50 | | |
| 9 | 50 | | 50 | | | |
| 10 | 50 | | | | 50 | |
| 11 | | 50 | | | | 50 |
| 12 | 50 | 40 | 10 | | | |
| 13 | 40 | 40 | 20 | | | |
| 14 | 20 | 40 | 40 | | | |
| 15 | 10 | 40 | 50 | | | |
| 16 | 40 | 50 | 10 | | | |
| 17 | 30 | 50 | 20 | | | |
| 18 | 20 | 50 | 30 | | | |
| 19 | 10 | 50 | 40 | | | |
| 20 | 30 | 60 | 10 | | | |
| 21 | 20 | 60 | 20 | | | |
| 22 | 10 | 60 | 30 | | | |
| 23 | 20 | 70 | 10 | | | |
| 24 | 10 | 70 | 20 | | | |
| 25 | 40 | 10 | 50 | | | |
| 26 | 50 | 10 | 40 | | | |
| 27 | 60 | 10 | 30 | | | |
| 28 | 70 | 10 | 20 | | | |
| 29 | 80 | 10 | 10 | | | |
| 30 | 40 | 20 | 40 | | | |
| 31 | 50 | 20 | 30 | | | |
| 32 | 60 | 20 | 20 | | | |
| 33 | 70 | 20 | 10 | | | |
| 34 | 60 | 30 | 10 | | | |
| 35 | 50 | 30 | 20 | | | |
| 36 | 40 | 30 | 30 | | | |
| 37 | 30 | 30 | 40 | | | |
| 38 | 40 | 55 | 5 | | | |
| 39 | 40 | 45 | 15 | | | |
| 40 | 40 | 35 | 25 | | | |
| 41 | 45 | 50 | 5 | | | |
| 42 | 45 | 45 | 10 | | | |
| 43 | 45 | 40 | 15 | | | |
| 44 | 45 | 35 | 20 | | | |
| 45 | 45 | 30 | 25 | | | |
| 46 | 45 | 25 | 30 | | | |
| 47 | 50 | 45 | 5 | | | |
| 48 | 50 | 35 | 15 | | | |
| 49 | 50 | 25 | 25 | | | |
| 50 | 55 | 40 | 5 | | | |
| 51 | 55 | 35 | 10 | | | |
| 52 | 55 | 30 | 15 | | | |
| 53 | 55 | 25 | 20 | | | |
| 54 | 55 | 20 | 25 | | | |
| 55 | 55 | 15 | 30 | | | |
| 56 | 30 | 45 | 25 | | | |
| 57 | 30 | 55 | 15 | | | |
| 58 | 30 | 65 | 5 | | | |
| 59 | 35 | 35 | 30 | | | |
| 60 | 35 | 40 | 25 | | | |
| 61 | 35 | 45 | 20 | | | |
| 62 | 35 | 50 | 15 | | | |
| 63 | 35 | 55 | 10 | | | |
| 64 | 35 | 60 | 5 | | | |

TABLE 3

| Working fluid | HFO-1123 | HFC-32 | HFO-1234ze(E) [mass %] |
|---|---|---|---|
| 65 | 10 | 75 | 15 |
| 66 | 10 | 60 | 30 |
| 67 | 10 | 44 | 46 |
| 68 | 10 | 40 | 50 |
| 69 | 20 | 75 | 5 |
| 70 | 20 | 60 | 20 |
| 71 | 20 | 44 | 36 |
| 72 | 20 | 40 | 40 |
| 73 | 30 | 44 | 26 |
| 74 | 30 | 30 | 40 |
| 75 | 35 | 60 | 5 |
| 76 | 35 | 35 | 30 |
| 77 | 40 | 44 | 16 |
| 78 | 45 | 35 | 20 |
| 79 | 45 | 25 | 30 |
| 80 | 50 | 45 | 5 |
| 81 | 50 | 10 | 40 |
| 82 | 55 | 35 | 10 |
| 83 | 55 | 15 | 30 |
| 84 | 60 | 25 | 15 |
| 85 | 65 | 30 | 5 |
| 86 | 65 | 15 | 20 |
| 87 | 80 | 15 | 5 |
| 88 | 80 | 10 | 10 |

Refrigerant oil 1: refrigerant oil containing a polyol ester as the main component (tradename: Ze-GLES RB-68, manufactured by JX Nippon Oil & Energy Corporation)
Refrigerant oil 2: refrigerant oil containing a polyvinyl ether as the main component (tradename: Daphne Hermetic Oil FVC68D, manufactured by Idemitsu Kosan Co., Ltd.)
Refrigerant oil 3: refrigerant oil containing a polyalkylene glycol as the main component (tradename: ND-8, manufactured by DENSO CORPORATION)
Refrigerant oil 4: refrigerant oil containing an alkylbenzene as the main component (tradename: ATMOS N22, manufactured by JX Nippon Oil & Energy Corporation, kinematic viscosity at 40° C. of 21.5 mm²/s)
Refrigerant oil 5: naphthene type higher refrigerant oil (tradename: SUNISO 4GS, manufactured by Idemitsu Kosan Co., Ltd.) (Circulation state of refrigerant oil)

Each of the composition for a heat cycle system obtained in Ex. was applied to a heat cycle system 10 shown in FIG. 1, and the heat cycle system was continuously operated. To evaluate the circulation state of the composition for a heat cycle system, part of a flow path from an evaporator 14 to a compressor 11 in the heat cycle system was constituted by a glass pipe. Through the glass pipe, the interior was observed to evaluate the circulation state of the composition for a heat cycle system in the heat cycle system. The circulation state was visually evaluated based on the following standards.

○: Circulation of the refrigerant oil was confirmed.

Δ: Although circulation of the refrigerant oil was confirmed, the circulation amount was insufficient.

x: Circulation of the refrigerant oil was not confirmed.

The results are shown in Tables 3 to 43. It was confirmed from the results that with all of the compositions for a heat cycle system in Ex. 1 to 40, 55 to 158, 185 to 292 and 320 to 415, circulation of the refrigerant oil was favorable, and results at the same level as R410A shown in conventional Examples 41 to 44 were obtained. Whereas in Ex. 45 to 54, 159 to 184, 293 to 319 and 416 to 439 in which the refrigerant oil 5 was used, no circulation of the refrigerant oil was confirmed by observation through the glass pipe, and desired performance as the composition for a heat cycle system was not obtained.

(Stability Test)

The stability test was carried out in accordance with the method of test for chemical stability of refrigerant and refrigerant oil (autoclave) described in JIS K2211, with respect to the compositions for a heat cycle system in a favorable circulation state, in Ex. 1 to 44, 55 to 158, 185 to 292 and 320 to 415.

Each of the compositions for a heat cycle system obtained in Ex. 1 to 44, 55 to 158, 185 to 292 and 320 to 415 was put in a 200 ml stainless steel pressure resistant container in which a 150 ml glass tube was put, and as a catalyst, iron, copper and aluminum test coupons were put in one pressure resistant container, and the container was closed. Then, the closed pressure resistant container was stored in a constant temperature chamber (perfect oven PHH-202, manufactured by ESPEC CORP.) at 175° C. for 14 days, and the acid content in the working fluid was measured, the color of the refrigerant oil was observed, and a change of the outer appearance of the catalyst was observed, as follows.

Further, as the metal coupons as the catalyst, the following were used.

a) Iron: a test coupon of cold-reduced carbon steel sheet (as stipulated in JIS G3141, SPCC—SB), 30 mm×25 mm×3.2 mm in thickness b) Copper: a test coupon of tough pitch copper (as stipulated in JIS H3100, alloy number C1100, C1100P), 30 mm×25 mm×2 mm in thickness c) Aluminum: a test coupon of pure aluminum (as stipulated in JIS H4000, alloy number 1050, A1050P), 30 mm×25 mm×2 mm in thickness (Measurement of acid content)

The acid content of the working fluid after the test was measured in accordance with JIS K1560 (1,1,1,2-tetrafluoroethane (HFC-134a)).

The pressure resistant container after the test was left at rest until its temperature became room temperature.

100 ml of pure water was respectively put into 4 absorption bulbs, and the absorption bulbs were connected in series by a capillary tube.

The absorption bulbs in which pure water was put connected to one another, were connected to the pressure resistant container at room temperature, and the valve of the pressure resistant reactor was gradually opened to introduce the refrigerant gas into the water in the absorption bulbs, and the acid content contained in the refrigerant gas was extracted.

The water in the first absorption bulb and the water in the second absorption bulb after extraction were put together, one drop of an indicator (BTB: bromothymol blue) was added, and titration was conducted with a 1/100N NaOH alkali standard solution. Further, the water in the third absorption bulb and the water in the fourth absorption bulb were put together, and titration was conducted in the same manner as blank measurement. From the measured value and the blank value, the acid content contained in the refrigerant after the test was obtained as the HCl concentration.

(Color of Refrigerant Oil)

After measurement of the acid content, the refrigerant oil remaining in the pressure resistant container from which the working fluid had been withdrawn, was taken out, and the color of the refrigerant oil was evaluated in accordance with ASTM-D156. The larger the value L, the higher the degree of coloring. Accordingly, the lower the value L, the more preferred. L is preferably at most 3.5, more preferably at most 3.0, further preferably at most 2.5.

(Change of Outer Appearance of Catalyst)

The outer appearance of the catalyst metal after the above test was visually confirmed, and the change of the outer appearance of the catalyst was evaluated based on the following standards.

○: No change was confirmed.

x: Gloss of the catalyst disappeared or the catalyst blackened.

In a case where the gloss of the catalyst disappeared or the catalyst blackened, the composition for a heat cycle system was deteriorated by the stability test.

TABLE 4

| | | Ex. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Refrigerant | | 1 | 1 | 1 | 1 | 2 | 2 | 2 | 2 | 3 | 3 | 3 | 3 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2 | L2 | L3.5 | L2 | L3 | L3 | L2 | L3 | L2 | L3 | L2 | L2 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 5

| | | Ex. | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Refrigerant | | 4 | 4 | 4 | 4 | 5 | 5 | 5 | 5 | 6 | 6 | 6 | 6 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L3 | L2 | L2 | L2 | L3 | L3 | L2.5 | L3 | L3 | L2 | L2.5 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 6

| | | Ex. | | | | | | | |
|---|---|---|---|---|---|---|---|---|---|
| | | 25 | 26 | 27 | 28 | 29 | 30 | 31 | 32 |
| Refrigerant | | 7 | 7 | 7 | 7 | 8 | 8 | 8 | 8 |
| Refrigerant oil | | 1 | 2 | 3 | 4 | 1 | 2 | 3 | 4 |
| Circulation state | | ○ | ○ | ○ | ○ | ○ | ○ | ○ | ○ |
| Acid content [ppm] | | <1 | <1 | <1 | <1 | <1 | <1 | <1 | <1 |
| Color | | L2.5 | L2 | L2 | L2 | L2 | L3 | L3 | L2.5 |
| Catalyst | Fe | ○ | ○ | ○ | ○ | ○ | ○ | ○ | ○ |
| | Cu | ○ | ○ | ○ | ○ | ○ | ○ | ○ | ○ |
| | Al | ○ | ○ | ○ | ○ | ○ | ○ | ○ | ○ |

| | | Ex. | | | | | | | |
|---|---|---|---|---|---|---|---|---|---|
| | | 33 | 34 | 35 | 36 | 37 | 38 | 39 | 40 |
| Refrigerant | | 9 | 9 | 9 | 9 | 10 | 10 | 10 | 10 |
| Refrigerant oil | | 1 | 2 | 3 | 4 | 1 | 2 | 3 | 4 |
| Circulation state | | ○ | ○ | ○ | ○ | ○ | ○ | ○ | ○ |
| Acid content [ppm] | | <1 | <1 | <1 | <1 | <1 | <1 | <1 | <1 |
| Color | | L2.5 | L2 | L2 | L2 | L2 | L3 | L3 | L2.5 |
| Catalyst | Fe | ○ | ○ | ○ | ○ | ○ | ○ | ○ | ○ |
| | Cu | ○ | ○ | ○ | ○ | ○ | ○ | ○ | ○ |
| | Al | ○ | ○ | ○ | ○ | ○ | ○ | ○ | ○ |

TABLE 8

| | | Ex. | | | |
|---|---|---|---|---|---|
| | | 41 | 42 | 43 | 44 |
| Refrigerant | | 11 | 11 | 11 | 11 |
| Refrigerant oil | | 1 | 2 | 3 | 4 |
| Circulation state | | ○ | ○ | ○ | ○ |
| Acid content [ppm] | | <1 | <1 | <1 | <1 |
| Color | | L3 | L3 | L2 | L2 |
| Catalyst | Fe | ○ | ○ | ○ | ○ |
| | Cu | ○ | ○ | ○ | ○ |
| | Al | ○ | ○ | ○ | ○ |

| | | Ex. | | | | | | | | | |
|---|---|---|---|---|---|---|---|---|---|---|---|
| | | 45 | 46 | 47 | 48 | 49 | 50 | 51 | 52 | 53 | 54 |
| Refrigerant | | 1 | 2 | 3 | 4 | 5 | 6 | 7 | 8 | 9 | 10 |
| Refrigerant oil | | 5 | 5 | 5 | 5 | 5 | 5 | 5 | 5 | 5 | 5 |
| Circulation state | | x | x | x | x | x | x | x | x | x | x |
| Acid content [ppm] | | — | — | — | — | — | — | — | — | — | — |
| Color | | — | — | — | — | — | — | — | — | — | — |
| Catalyst | Fe | — | — | — | — | — | — | — | — | — | — |
| | Cu | — | — | — | — | — | — | — | — | — | — |
| | Al | — | — | — | — | — | — | — | — | — | — |

| | | Ex. | | | | | | | | | | | |
|---|---|---|---|---|---|---|---|---|---|---|---|---|---|
| | | 55 | 56 | 57 | 58 | 59 | 60 | 61 | 62 | 63 | 64 | 65 | 66 |
| Refrigerant | | 12 | 12 | 12 | 12 | 13 | 13 | 13 | 13 | 14 | 14 | 14 | 14 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

| | | Ex. | | | | | | | | | | | |
|---|---|---|---|---|---|---|---|---|---|---|---|---|---|
| | | 67 | 68 | 69 | 70 | 71 | 72 | 73 | 74 | 75 | 76 | 77 | 78 |
| Refrigerant | | 15 | 15 | 15 | 15 | 16 | 16 | 16 | 16 | 17 | 17 | 17 | 17 |
| Refrigerant oil | | 1 | 2 | 3 | 4 | 1 | 2 | 3 | 4 | 1 | 2 | 3 | 4 |

-continued

|  | Ex. | | | | | | | | | | | |
|---|---|---|---|---|---|---|---|---|---|---|---|---|
|  | 67 | 68 | 69 | 70 | 71 | 72 | 73 | 74 | 75 | 76 | 77 | 78 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |

-continued

|  |  | Ex. | | | | | | | | | | | |
|---|---|---|---|---|---|---|---|---|---|---|---|---|---|
|  |  | 67 | 68 | 69 | 70 | 71 | 72 | 73 | 74 | 75 | 76 | 77 | 78 |
| Color |  | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 12

|  |  | Ex. | | | | | | | | | | | |
|---|---|---|---|---|---|---|---|---|---|---|---|---|---|
|  |  | 79 | 80 | 81 | 82 | 83 | 84 | 85 | 86 | 87 | 88 | 89 | 90 |
| Refrigerant |  | 18 | 18 | 18 | 18 | 19 | 19 | 19 | 19 | 20 | 20 | 20 | 20 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 13

|  |  | Ex. | | | | | | | | | | | |
|---|---|---|---|---|---|---|---|---|---|---|---|---|---|
|  |  | 91 | 92 | 93 | 94 | 95 | 96 | 97 | 98 | 99 | 100 | 101 | 102 |
| Refrigerant |  | 21 | 21 | 21 | 21 | 22 | 22 | 22 | 22 | 23 | 23 | 23 | 23 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2 | L2 | L2.5 | L3 | L2 | L2 | L2.5 | L3 | L2.5 | L2.5 | L3 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 14

|  |  | Ex. | | | | | | | | | | | |
|---|---|---|---|---|---|---|---|---|---|---|---|---|---|
|  |  | 103 | 104 | 105 | 106 | 107 | 108 | 109 | 110 | 111 | 112 | 113 | 114 |
| Refrigerant |  | 24 | 24 | 24 | 24 | 25 | 25 | 25 | 25 | 26 | 26 | 26 | 26 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 15

|  | Ex. | | | | | | | | | | | |
|---|---|---|---|---|---|---|---|---|---|---|---|---|
|  | 115 | 116 | 117 | 118 | 119 | 120 | 121 | 122 | 123 | 124 | 125 | 126 |
| Refrigerant | 27 | 27 | 27 | 27 | 28 | 28 | 28 | 28 | 29 | 29 | 29 | 29 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |

TABLE 15-continued

| | | Ex. | | | | | | | | | | | |
|---|---|---|---|---|---|---|---|---|---|---|---|---|---|
| | | 115 | 116 | 117 | 118 | 119 | 120 | 121 | 122 | 123 | 124 | 125 | 126 |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 16

| | | Ex. | | | | | | | | | | | |
|---|---|---|---|---|---|---|---|---|---|---|---|---|---|
| | | 127 | 128 | 129 | 130 | 131 | 132 | 133 | 134 | 135 | 136 | 137 | 138 |
| Refrigerant | | 30 | 30 | 30 | 30 | 31 | 31 | 31 | 31 | 32 | 32 | 32 | 32 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 17

| | | Ex. | | | | | | | | | | | |
|---|---|---|---|---|---|---|---|---|---|---|---|---|---|
| | | 139 | 140 | 141 | 142 | 143 | 144 | 145 | 146 | 147 | 148 | 149 | 150 |
| Refrigerant | | 33 | 33 | 33 | 33 | 34 | 34 | 34 | 34 | 35 | 35 | 35 | 35 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 18

| | | Ex. | | | | | | | |
|---|---|---|---|---|---|---|---|---|---|
| | | 151 | 152 | 153 | 154 | 155 | 156 | 157 | 158 |
| Refrigerant | | 36 | 36 | 36 | 36 | 37 | 37 | 37 | 37 |
| Refrigerant oil | | 1 | 2 | 3 | 4 | 1 | 2 | 3 | 4 |
| Circulation state | | ○ | ○ | ○ | ○ | ○ | ○ | ○ | ○ |
| Acid content [ppm] | | <1 | <1 | <1 | <1 | <1 | <1 | <1 | <1 |
| Color | | L2.5 | L2.5 | L3 | L3 | L2.5 | L2.5 | L3 | L3 |
| Catalyst | Fe | ○ | ○ | ○ | ○ | ○ | ○ | ○ | ○ |
| | Cu | ○ | ○ | ○ | ○ | ○ | ○ | ○ | ○ |
| | Al | ○ | ○ | ○ | ○ | ○ | ○ | ○ | ○ |

TABLE 19

| | | Ex. | | | | | | | | | | | |
|---|---|---|---|---|---|---|---|---|---|---|---|---|---|
| | | 159 | 160 | 161 | 162 | 163 | 164 | 165 | 166 | 167 | 168 | 169 | 170 |
| Refrigerant | | 12 | 13 | 14 | 15 | 16 | 17 | 18 | 19 | 20 | 21 | 22 | 23 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |
| Catalyst | Fe | — | — | — | — | — | — | — | — | — | — | — | — |
| | Cu | — | — | — | — | — | — | — | — | — | — | — | — |
| | Al | — | — | — | — | — | — | — | — | — | — | — | — |

TABLE 20

| | | Ex. | | | | | | | | | | | |
|---|---|---|---|---|---|---|---|---|---|---|---|---|---|
| | | 171 | 172 | 173 | 174 | 175 | 176 | 177 | 178 | 179 | 180 | 181 | 182 |
| Refrigerant | | 24 | 25 | 26 | 27 | 28 | 29 | 30 | 31 | 32 | 33 | 34 | 35 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |

TABLE 20-continued

|  |  | Ex. | | | | | | | | | | | |
|---|---|---|---|---|---|---|---|---|---|---|---|---|
|  |  | 171 | 172 | 173 | 174 | 175 | 176 | 177 | 178 | 179 | 180 | 181 | 182 |
| Catalyst | Fe | — | — | — | — | — | — | — | — | — | — | — | — |
|  | Cu | — | — | — | — | — | — | — | — | — | — | — | — |
|  | Al | — | — | — | — | — | — | — | — | — | — | — | — |

TABLE 21

|  |  | Ex. | |
|---|---|---|---|
|  |  | 183 | 184 |
| Refrigerant |  | 36 | 37 |
| Refrigerant oil |  | 5 | 5 |
| Circulation state |  | X | X |
| Acid content [ppm] |  | — | — |
| Color |  | — | — |
| Catalyst | Fe | — | — |
|  | Cu | — | — |
|  | Al | — | — |

TABLE 22

|  |  | Ex. | | | | | | | | | | | |
|---|---|---|---|---|---|---|---|---|---|---|---|---|
|  |  | 185 | 186 | 187 | 188 | 189 | 190 | 191 | 192 | 193 | 194 | 195 | 196 |
| Refrigerant |  | 38 | 38 | 38 | 38 | 39 | 39 | 39 | 39 | 40 | 40 | 40 | 40 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 23

|  |  | Ex. | | | | | | | | | | | |
|---|---|---|---|---|---|---|---|---|---|---|---|---|
|  |  | 197 | 198 | 199 | 200 | 201 | 202 | 203 | 204 | 205 | 206 | 207 | 208 |
| Refrigerant |  | 41 | 41 | 41 | 41 | 42 | 42 | 42 | 42 | 43 | 43 | 43 | 43 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 24

|  |  | Ex. | | | | | | | | | | | |
|---|---|---|---|---|---|---|---|---|---|---|---|---|
|  |  | 209 | 210 | 211 | 212 | 213 | 214 | 215 | 216 | 217 | 218 | 219 | 220 |
| Refrigerant |  | 44 | 44 | 44 | 44 | 45 | 45 | 45 | 45 | 46 | 46 | 46 | 46 |
| Refrigerant oil |  | 1 | 2 | 3 | 4 | 1 | 2 | 3 | 4 | 1 | 2 | 3 | 4 |
| Circulation state |  | ○ | ○ | ○ | ○ | ○ | ○ | ○ | ○ | ○ | ○ | ○ | ○ |
| Acid content [ppm] |  | <1 | <1 | <1 | <1 | <1 | <1 | <1 | <1 | <1 | <1 | <1 | <1 |
| Color |  | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
|  | Cu | ○ | ○ | ○ | ○ | ○ | ○ | ○ | ○ | ○ | ○ | ○ | ○ |
|  | Al | ○ | ○ | ○ | ○ | ○ | ○ | ○ | ○ | ○ | ○ | ○ | ○ |

TABLE 25

| | Ex. | | | | | | | | | | | |
|---|---|---|---|---|---|---|---|---|---|---|---|---|
| | 221 | 222 | 223 | 224 | 225 | 226 | 227 | 228 | 229 | 230 | 231 | 232 |
| Refrigerant | 47 | 47 | 47 | 47 | 48 | 48 | 48 | 48 | 49 | 49 | 49 | 49 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2 | L2 | L2.5 | L3 | L2 | L2 | L2.5 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 26

| | Ex. | | | | | | | | | | | |
|---|---|---|---|---|---|---|---|---|---|---|---|---|
| | 233 | 234 | 235 | 236 | 237 | 238 | 239 | 240 | 241 | 242 | 243 | 244 |
| Refrigerant | 50 | 50 | 50 | 50 | 51 | 51 | 51 | 51 | 52 | 52 | 52 | 52 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2.5 | L2.5 | L3 | L3 | L2.5 | L2.5 | L3 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 27

| | Ex. | | | | | | | | | | | |
|---|---|---|---|---|---|---|---|---|---|---|---|---|
| | 245 | 246 | 247 | 248 | 249 | 250 | 251 | 252 | 253 | 254 | 255 | 256 |
| Refrigerant | 53 | 53 | 53 | 53 | 54 | 54 | 54 | 54 | 55 | 55 | 55 | 55 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2.5 | L2.5 | L3 | L3 | L2.5 | L2.5 | L3 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 28

| | Ex. | | | | | | | | | | | |
|---|---|---|---|---|---|---|---|---|---|---|---|---|
| | 257 | 258 | 259 | 260 | 261 | 262 | 263 | 264 | 265 | 266 | 267 | 268 |
| Refrigerant | 56 | 56 | 56 | 56 | 57 | 57 | 57 | 57 | 58 | 58 | 58 | 58 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2.5 | L2.5 | L3 | L3 | L2.5 | L2.5 | L3 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 29

| | Ex. | | | | | | | | | | | |
|---|---|---|---|---|---|---|---|---|---|---|---|---|
| | 269 | 270 | 271 | 272 | 273 | 274 | 275 | 276 | 277 | 278 | 279 | 280 |
| Refrigerant | 59 | 59 | 59 | 59 | 60 | 60 | 60 | 60 | 61 | 61 | 61 | 61 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2.5 | L2.5 | L3 | L3 | L2.5 | L2.5 | L3 | L3 | L2.5 | L2.5 | L3 | L3 |

TABLE 29-continued

| | | Ex. | | | | | | | | | | | | |
|---|---|---|---|---|---|---|---|---|---|---|---|---|---|---|
| | | 269 | 270 | 271 | 272 | 273 | 274 | 275 | 276 | 277 | 278 | 279 | 280 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 30

| | | Ex. | | | | | | | | | | | |
|---|---|---|---|---|---|---|---|---|---|---|---|---|---|
| | | 281 | 282 | 283 | 284 | 285 | 286 | 287 | 288 | 289 | 290 | 291 | 292 |
| Refrigerant | | 62 | 62 | 62 | 62 | 63 | 63 | 63 | 63 | 64 | 64 | 64 | 64 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 31

| | | Ex. | | | | | | | | | | | |
|---|---|---|---|---|---|---|---|---|---|---|---|---|---|
| | | 293 | 294 | 295 | 296 | 297 | 298 | 299 | 300 | 301 | 302 | 303 | 304 |
| Refrigerant | | 38 | 39 | 40 | 41 | 42 | 43 | 44 | 45 | 46 | 47 | 48 | 49 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |
| Catalyst | Fe | — | — | — | — | — | — | — | — | — | — | — | — |
| | Cu | — | — | — | — | — | — | — | — | — | — | — | — |
| | Al | — | — | — | — | — | — | — | — | — | — | — | — |

TABLE 32

| | | Ex. | | | | | | | | | | | |
|---|---|---|---|---|---|---|---|---|---|---|---|---|---|
| | | 305 | 306 | 307 | 308 | 309 | 310 | 311 | 312 | 313 | 314 | 315 | 316 |
| Refrigerant | | 50 | 51 | 52 | 53 | 54 | 55 | 56 | 57 | 58 | 59 | 60 | 61 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |
| Catalyst | Fe | — | — | — | — | — | — | — | — | — | — | — | — |
| | Cu | — | — | — | — | — | — | — | — | — | — | — | — |
| | Al | — | — | — | — | — | — | — | — | — | — | — | — |

TABLE 33

| | | Ex. | | |
|---|---|---|---|---|
| | | 317 | 318 | 319 |
| Refrigerant | | 62 | 63 | 64 |
| Refrigerant oil | | 5 | 5 | 5 |
| Circulation state | | X | X | X |
| Acid content [ppm] | | — | — | — |
| Color | | — | — | — |
| Catalyst | Fe | — | — | — |
| | Cu | — | — | — |
| | Al | — | — | — |

TABLE 34

| | | Ex. | | | | | | | | | | | |
|---|---|---|---|---|---|---|---|---|---|---|---|---|---|
| | | 320 | 321 | 322 | 323 | 324 | 325 | 326 | 327 | 328 | 329 | 330 | 331 |
| Refrigerant | | 65 | 65 | 65 | 65 | 66 | 66 | 66 | 66 | 67 | 67 | 67 | 67 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2 | L2 | L2.5 | L3 | L2 | L2 | L2.5 | L3 | L2 | L2 | L2.5 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 35

| | Ex. | | | | | | | | | | | |
|---|---|---|---|---|---|---|---|---|---|---|---|---|
| | 332 | 333 | 334 | 335 | 336 | 337 | 338 | 339 | 340 | 341 | 342 | 343 |
| Refrigerant | 68 | 68 | 68 | 68 | 69 | 69 | 69 | 69 | 70 | 70 | 70 | 70 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2 | L2 | L2.5 | L3 | L2 | L2 | L2.5 | L3 | L2 | L2 | L2.5 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 36

| | Ex. | | | | | | | | | | | |
|---|---|---|---|---|---|---|---|---|---|---|---|---|
| | 344 | 345 | 346 | 347 | 348 | 349 | 350 | 351 | 352 | 353 | 354 | 355 |
| Refrigerant | 71 | 71 | 71 | 71 | 72 | 72 | 72 | 72 | 73 | 73 | 73 | 73 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2 | L2 | L2.5 | L3 | L2 | L2 | L2.5 | L3 | L2 | L2 | L2.5 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 37

| | Ex. | | | | | | | | | | | |
|---|---|---|---|---|---|---|---|---|---|---|---|---|
| | 361 | 362 | 363 | 364 | 365 | 366 | 367 | 356 | 357 | 358 | 359 | 360 |
| Refrigerant | 74 | 74 | 74 | 74 | 75 | 75 | 75 | 75 | 76 | 76 | 76 | 76 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2 | L2 | L2.5 | L3 | L2 | L2 | L2.5 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 38

| | Ex. | | | | | | | | | | | |
|---|---|---|---|---|---|---|---|---|---|---|---|---|
| | 368 | 369 | 370 | 371 | 372 | 373 | 374 | 375 | 376 | 377 | 378 | 379 |
| Refrigerant | 77 | 77 | 77 | 77 | 78 | 78 | 78 | 78 | 79 | 79 | 79 | 79 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |
| Acid content [ppm] | <1 | <1 | <1 | <1 | <1 | <1 | <1 | <1 | <1 | <1 | <1 | <1 |
| Color | L2.5 | L2.5 | L3 | L3 | L2.5 | L2.5 | L3 | L3 | L2.5 | L2.5 | L3 | L3 |
| Catalyst Fe | ○ | ○ | ○ | ○ | ○ | ○ | ○ | ○ | ○ | ○ | ○ | ○ |
| Cu | ○ | ○ | ○ | ○ | ○ | ○ | ○ | ○ | ○ | ○ | ○ | ○ |
| Al | ○ | ○ | ○ | ○ | ○ | ○ | ○ | ○ | ○ | ○ | ○ | ○ |

TABLE 39

| | Ex. | | | | | | | | | | | |
|---|---|---|---|---|---|---|---|---|---|---|---|---|
| | 380 | 381 | 382 | 383 | 384 | 385 | 386 | 387 | 388 | 389 | 390 | 391 |
| Refrigerant | 80 | 80 | 80 | 80 | 81 | 81 | 81 | 81 | 82 | 82 | 82 | 82 |
| Refrigerant oil | 1 | 2 | 3 | 4 | 1 | 2 | 3 | 4 | 1 | 2 | 3 | 4 |
| Circulation state | ○ | ○ | ○ | ○ | ○ | ○ | ○ | ○ | ○ | ○ | ○ | ○ |

TABLE 39-continued

| | | Ex. | | | | | | | | | | | |
|---|---|---|---|---|---|---|---|---|---|---|---|---|---|
| | | 380 | 381 | 382 | 383 | 384 | 385 | 386 | 387 | 388 | 389 | 390 | 391 |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 40

| | | Ex. | | | | | | | | | | | |
|---|---|---|---|---|---|---|---|---|---|---|---|---|---|
| | | 392 | 393 | 394 | 395 | 396 | 397 | 398 | 399 | 400 | 401 | 402 | 403 |
| Refrigerant | | 83 | 83 | 83 | 83 | 84 | 84 | 84 | 84 | 85 | 85 | 85 | 85 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 41

| | | Ex. | | | | | | | | | | | |
|---|---|---|---|---|---|---|---|---|---|---|---|---|---|
| | | 404 | 405 | 406 | 407 | 408 | 409 | 410 | 411 | 412 | 413 | 414 | 415 |
| Refrigerant | | 86 | 86 | 86 | 86 | 87 | 87 | 87 | 87 | 88 | 88 | 88 | 88 |
| Refrigerant oil | | 1 | 2 | 3 | 4 | 1 | 2 | 3 | 4 | 1 | 2 | 3 | 4 |
| Circulation state | | ○ | ○ | ○ | ○ | ○ | ○ | ○ | ○ | ○ | ○ | ○ | ○ |
| Acid content [ppm] | | <1 | <1 | <1 | <1 | <1 | <1 | <1 | <1 | <1 | <1 | <1 | <1 |
| Color | | L2.5 | L2.5 | L3 | L3 | L2.5 | L2.5 | L3 | L3 | L2.5 | L2.5 | L3 | L3 |
| Catalyst | Fe | ○ | ○ | ○ | ○ | ○ | ○ | ○ | ○ | ○ | ○ | ○ | ○ |
| | Cu | ○ | ○ | ○ | ○ | ○ | ○ | ○ | ○ | ○ | ○ | ○ | ○ |
| | Al | ○ | ○ | ○ | ○ | ○ | ○ | ○ | ○ | ○ | ○ | ○ | ○ |

TABLE 42

| | | Ex. | | | | | | | | | | | |
|---|---|---|---|---|---|---|---|---|---|---|---|---|---|
| | | 416 | 417 | 418 | 419 | 420 | 421 | 422 | 423 | 424 | 425 | 426 | 427 |
| Refrigerant | | 65 | 66 | 67 | 68 | 69 | 70 | 71 | 72 | 73 | 74 | 75 | 76 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |
| Catalyst | Fe | — | — | — | — | — | — | — | — | — | — | — | — |
| | Cu | — | — | — | — | — | — | — | — | — | — | — | — |
| | Al | — | — | — | — | — | — | — | — | — | — | — | — |

TABLE 43

| | | Ex. | | | | | | | | | | | |
|---|---|---|---|---|---|---|---|---|---|---|---|---|---|
| | | 428 | 429 | 430 | 431 | 432 | 433 | 434 | 435 | 436 | 437 | 438 | 439 |
| Refrigerant | | 77 | 78 | 79 | 80 | 81 | 82 | 83 | 84 | 85 | 86 | 87 | 88 |
| Refrigerant oil | | 5 | 5 | 5 | 5 | 5 | 5 | 5 | 5 | 5 | 5 | 5 | 5 |
| Circulation state | | x | x | x | x | x | x | x | x | x | x | x | x |
| Acid content [ppm] | | — | — | — | — | — | — | — | — | — | — | — | — |
| Color | | — | — | — | — | — | — | — | — | — | — | — | — |
| Catalyst | Fe | — | — | — | — | — | — | — | — | — | — | — | — |
| | Cu | — | — | — | — | — | — | — | — | — | — | — | — |
| | Al | — | — | — | — | — | — | — | — | — | — | — | — |

From the above results, it was found that all the compositions for a heat cycle system in Ex. 1 to 40, 55 to 158, 185 to 292, and 320 to 415 which are Examples of the present invention have the same properties as conventional compositions and are suitable as a composition for a heat cycle system.

INDUSTRIAL APPLICABILITY

The composition for a heat cycle system and a heat cycle system employing the composition of the present invention are useful for a refrigerator (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

REFERENCE SYMBOLS

10: refrigerating cycle system, 11: compressor, 12: condenser, 13: expansion valve, 14: evaporator, 15, 16: pump

What is claimed is:

1. A composition for a heat cycle system, comprising: a working fluid for heat cycle; and a refrigerant oil, wherein the working fluid for a heat cycle comprises at least 95 mass % of trifluoroethylene (HFO-1123), difluoromethane (HFC-32), and (E)-1,3,3,3-tetrafluoropropene (HFO-1234ze(E)) in amounts of:

10 mass %≤HFO-1123≤80 mass %;

10 mass %≤HFC-32≤75 mass %; and 5 mass %≤HFO-1234ze(E)≤60 mass %

2. The composition for a heat cycle system according to claim 1, wherein the refrigerant oil is at least one member selected from an ester refrigerant oil, an ether refrigerant oil, a polyglycol refrigerant oil and a hydrocarbon refrigerant oil.

3. The composition for a heat cycle system according to claim 2, wherein the refrigerant oil is at least one member selected from a dibasic acid ester, a polyol ester, a complex ester, a polyol carbonate ester, a polyvinyl ether, a polyalkylene glycol and an alkylbenzene.

4. The composition for a heat cycle system according to claim 1, wherein the kinematic viscosity of the refrigerant oil at 40° C. is from 1 to 750 $mm^2/s$.

5. The composition for a heat cycle system according to claim 1, wherein the kinematic viscosity of the refrigerant oil at 100° C. is from 1 to 100 $mm^2/s$.

6. The composition for a heat cycle system according to claim 1, wherein a carbon/oxygen molar ratio, which is a ratio of the number of carbon atoms to the number of oxygen atoms, of the refrigerant oil is from 2 to 7.5.

7. The composition for a heat cycle system according to claim 1, wherein the content of trifluoroethylene is from 20 to 80 mass % per 100 mass % of the working fluid for heat cycle.

8. The composition for a heat cycle system according to claim 1, wherein the content of difluoromethane is at least 20 mass % per 100 mass % of the working fluid for heat cycle.

9. A heat cycle system, comprising the composition for a heat cycle system as defined in claim 1.

10. The heat cycle system according to claim 9, wherein the heat cycle is a refrigerating apparatus, an air-conditioning apparatus, a power generation system, a heat transport apparatus or a secondary cooling machine.

11. The composition for a heat cycle system according to claim 1, wherein the amount of HFC-32 in the working fluid for a heat cycle is at most 30 mass % with respect to 100 mass % of the working fluid for a heat cycle.

* * * * *